(12) United States Patent
Garcia

(10) Patent No.: US 10,370,094 B2
(45) Date of Patent: Aug. 6, 2019

(54) MULTI-SPEED GEARBOX FOR TAIL ROTOR OF A COMPOUND HELICOPTER

(71) Applicant: SIKORSKY AIRCRAFT CORPORATION, Stratford, CT (US)

(72) Inventor: Todd A. Garcia, Mansfield, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 224 days.

(21) Appl. No.: 15/327,573

(22) PCT Filed: Jul. 15, 2015

(86) PCT No.: PCT/US2015/040479
§ 371 (c)(1),
(2) Date: Jan. 19, 2017

(87) PCT Pub. No.: WO2016/014301
PCT Pub. Date: Jan. 28, 2016

(65) Prior Publication Data
US 2018/0215463 A1  Aug. 2, 2018

Related U.S. Application Data

(60) Provisional application No. 62/026,874, filed on Jul. 21, 2014.

(51) Int. Cl.
*B64C 27/12* (2006.01)
*B64C 27/10* (2006.01)
*B64C 27/82* (2006.01)

(52) U.S. Cl.
CPC .............. *B64C 27/12* (2013.01); *B64C 27/10* (2013.01); *B64C 27/82* (2013.01); *B64C 2027/8236* (2013.01)

(58) Field of Classification Search
CPC ......... B64C 27/12; B64C 27/10; B64C 27/82; B64C 2027/8236; B64D 35/00; B64D 35/04
See application file for complete search history.

(56) References Cited

U.S. PATENT DOCUMENTS 3,977,812 A * 8/1976 Hudgins ................. B64C 27/12
416/123
4,632,337 A * 12/1986 Moore .................... B64C 27/12
244/17.19

(Continued)

OTHER PUBLICATIONS

International Search Report for International Appln. No. PCT/US2015/040479; International Filing Date: Jul. 15, 2015; dated Oct. 5, 2015; 7 pages.

(Continued)

*Primary Examiner* — Assres H Woldemaryam
(74) *Attorney, Agent, or Firm* — Cantor Colburn LLP

(57) ABSTRACT

A rotary wing aircraft and method of operating a tail drive system thereof, wherein the tail drive system includes a gearbox that contains a first transmissive device and a second transmissive device in parallel, each transmissive device having an input operatively connected to a first shaft that is powered by the main rotor drive system. The first and second transmissive devices each have an output operatively connected to a second shaft that drives the secondary rotary device.

11 Claims, 4 Drawing Sheets

(56) References Cited

U.S. PATENT DOCUMENTS

| | | | | |
|---|---|---|---|---|
| 6,098,921 | A * | 8/2000 | Piasecki | B64C 27/14 244/17.19 |
| 7,296,767 | B2 * | 11/2007 | Palcic | B64C 27/10 244/17.11 |
| 7,434,764 | B2 * | 10/2008 | Lappos | B64C 27/14 244/17.11 |
| 7,604,198 | B2 * | 10/2009 | Petersen | B64C 27/10 244/17.23 |
| 8,967,532 | B2 | 3/2015 | Vialle | |
| 9,290,266 | B2 * | 3/2016 | Robertson | F16H 3/724 |
| 2010/0044498 | A1 * | 2/2010 | Palcic | B64C 27/10 244/17.21 |

OTHER PUBLICATIONS

Written Opinion of International Searching Authority for International Appln. No. PCT/US2015/040479; International Filing Date: Jul. 15, 2015; dated Oct. 5, 2015; 5 pages.

Extended European Search Report; European Application No. 15825477.1; dated Jan. 12, 2018; 8 Pages.

* cited by examiner

MULTI-SPEED GEARBOX FOR TAIL ROTOR OF A COMPOUND HELICOPTER

CROSS REFERENCE TO RELATED APPLICATIONS

This application is a National Stage application of PCT/US2015/040479, filed Jul. 15, 2015, which claims the benefit of U.S. Provisional Application No. 62/026,874, filed Jul. 21, 2014, both of which are incorporated by reference in their entirety herein.

BACKGROUND

The present disclosure relates generally to a rotary-wing aircraft and, more particularly, to a rotary wing transmission gearbox system which provides variable speeds to facilitate high speed and low speed flight profiles.

The forward airspeed of a conventional rotary wing aircraft is limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Conventional rotors must be operated at airspeeds lower than those which cause reverse airflow across a substantial part of the retreating blade and at an rpm low enough to alleviate any potential compressibility Mach number problems at the tip of the advancing blade. This has effectively limited forward airspeeds of conventional helicopters to approximately 180 knots.

A rotary wing aircraft with a coaxial counter-rotating rigid rotor system is capable of higher speeds as compared to conventional single rotor helicopters partly due to the balance of lift between the advancing sides of the main rotor blades on the upper and lower rotor systems. In addition, the retreating side of the rotor discs are also generally free from classic retreating blade stall due to offloading of the retreating disc sector with increasing airspeed to obtain roll equilibrium by balancing the net effects of the equal and opposite moments produced by the advancing sectors of the upper and lower counter-rotating rotor systems. To still further increase airspeed, a compound rotary wing aircraft may incorporate supplemental translational thrust.

For rotary wing aircraft with a coaxial counter rotating rotor system, it is usually unnecessary to dedicate a tail rotor for balancing the torque generated by the main rotors. This allows rotary wing aircraft with coaxial counter rotating rotors to include a tail drive system for propulsion purposes. Currently available tail drive systems are typically powered by operatively connecting the drive system to one or more engines or by operatively connecting the drive system to run parallel to a main gearbox that drives the main rotor or rotors. Such configurations typically do not provide the ability to lower the RPM of the tail drive system without affecting the RPM of the main rotor system, and vice versa. The industry is always receptive to improvements in tail drive systems, particularly those that offer greater control over rotor speed.

SUMMARY

Disclosed herein is a rotary wing aircraft having a main rotor drive system and a tail drive system that operates a secondary rotary device. The tail drive system includes a first transmissive device and a second transmissive device in parallel, each transmissive device having an input operatively connected to a first shaft that is powered by the main rotor drive system. The first and second transmissive devices each have an output operatively connected to a second shaft that drives the secondary rotary device.

In addition to one or more of the features described above, or as an alternative, in further embodiments, the first transmissive device may be a freewheel unit.

In addition to one or more of the features described above, or as an alternative, in further embodiments, the secondary device may be a multiple plate clutch.

In addition to one or more of the features described above, or as an alternative, in further embodiments, the secondary rotary device may be a push propeller.

In addition to one or more of the features described above, or as an alternative, in further embodiments, the first and second transmissions may be connected in parallel by a first gear reduction associated with the first shaft and a second gear reduction associated with the second shaft.

In addition to one or more of the features described above, or as an alternative, in further embodiments, the second gear reduction has a gear ratio that is greater than a gear ratio of the first gear reduction.

In addition to one or more of the features described above, or as an alternative, in further embodiments, the first shaft is directly connected to the input of the first transmissive device and the first shaft is operatively connected to the input of the second transmissive device via the first gear reduction.

In addition to one or more of the features described above, or as an alternative, in further embodiments, the second shaft may be directly connected to the output of the second transmissive device and the second shaft may be operatively connected to the output of the first transmissive device via the second gear reduction.

In addition to one or more of the features described above, or as an alternative, in further embodiments, the second shaft may be directly connected to the output of the first transmissive device and the second shaft may be operatively connected to the output of the second transmissive device via the second gear reduction.

Another aspect of the disclosure provides a method of operating a rotary wing aircraft having a multi-speed tail drive system. Torque is generated by a main rotor drive system and delivered to a tail drive gearbox containing a freewheel unit and a transmissive device in parallel. The transmissive device is manipulated to control the speed of a secondary rotary device.

In addition to one or more of the features described above, or as an alternative, in further embodiments, the transmissive device may be configured to operate the secondary rotary device at two distinct speeds for a given input.

In addition to one or more of the features described above, or as an alternative, in further embodiments, manipulating the transmissive device may target an increase in engine efficiency

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures. It is to be understood that other embodiments may be utilized and changes may be made without departing from the scope of the present disclosure.

Figure 1A:
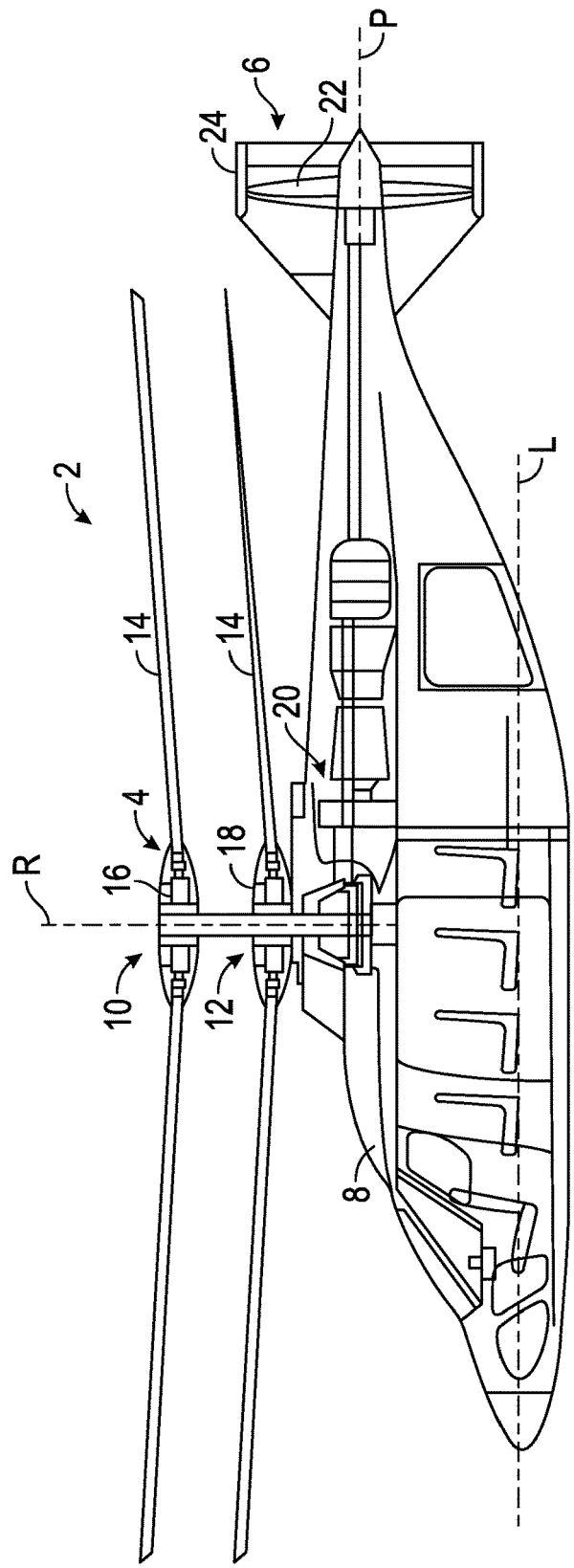
FIG. 1A is a side view of a rotary wing aircraft according to one embodiment.
Figure 1B:
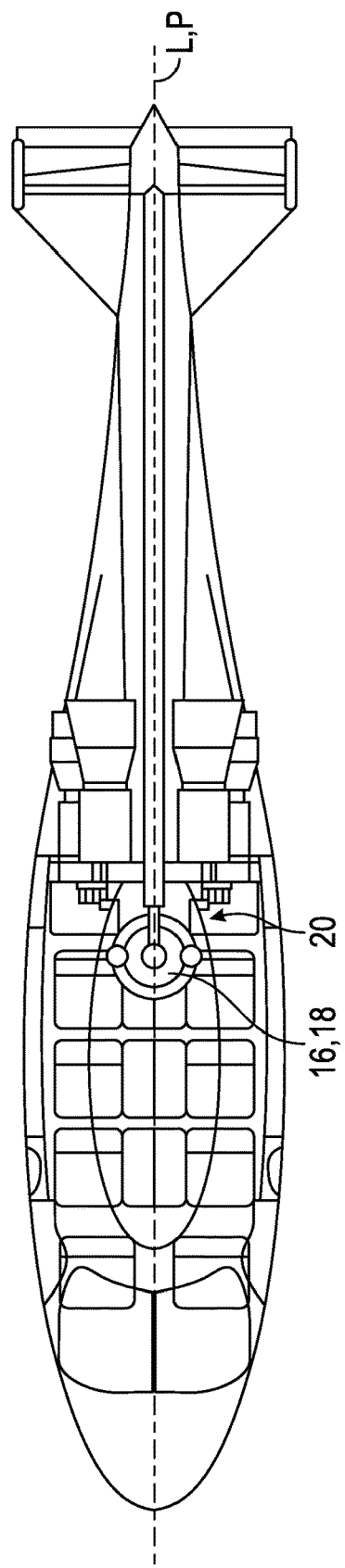
FIG. 1B is a top view of the rotary wing aircraft shown in FIG. 1A.
Figure 1C:
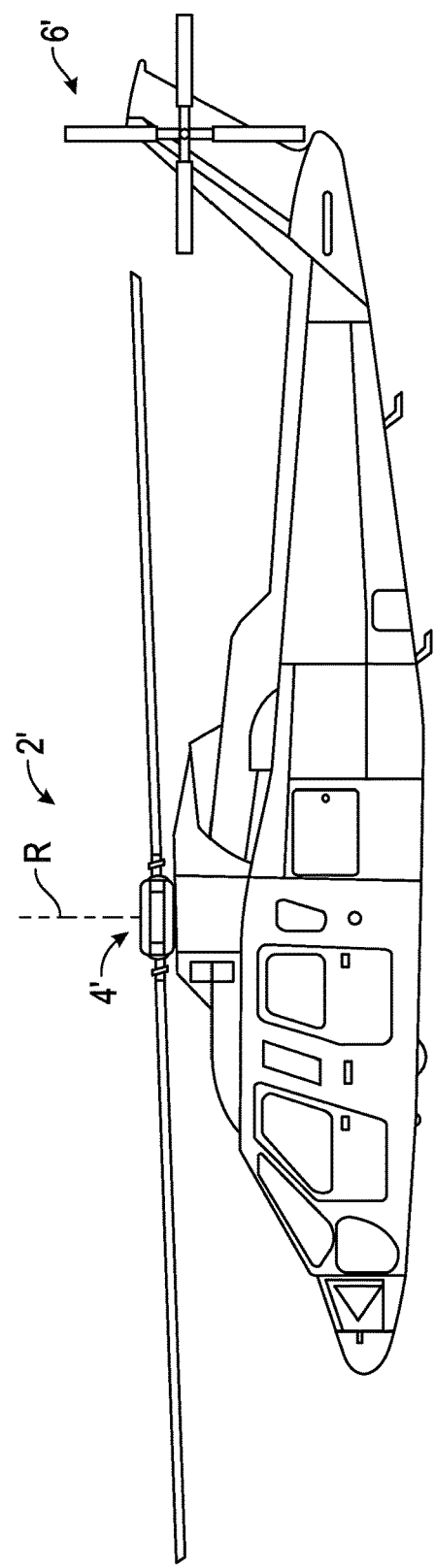
FIG. 1C is a side view of a rotary wing aircraft according to another embodiment.

FIGS. 1A and 1B illustrate a vertical takeoff and landing (VTOL) rotary-wing aircraft 2 having a main rotor system 4 and a tail drive system 6. The main rotor system 4 is preferably a dual, counter-rotating, coaxial rotor system, however, any other rotor system known in the art including, but not limited to, single, tandem and dual rotor systems may also be used with the present invention. That is, although the present invention is being described in combination with a high speed compound rotary wing aircraft utilizing a translational thrust system 6, other aircraft configurations, including a more conventional configuration of a rotary wing aircraft 2' with a single main rotor system 4' and an anti-torque tail rotor system 6' (FIG. 1C) will also benefit from the present invention.

As shown, the aircraft 2 includes an airframe 8 which supports the main rotor system 4. The aircraft 2 may also incorporate a tail drive system 6. The tail drive system 6 may be a translational thrust system that provides translational thrust generally parallel to an aircraft longitudinal axis L.

The main rotor system 4 preferably includes a first rotor system 10 and a second rotor system 12. Each rotor system 10, 12 includes a plurality of main rotor blades 14 mounted to a rotor hub 16, 18 for rotation about a rotor axis of rotation R. A main rotor drive system 20 drives the main rotor system 4 and the tail drive system 6. The tail drive system 6 preferably includes a pusher propeller 22 having a propeller rotational axis P oriented substantially horizontal and parallel to the aircraft longitudinal axis L to provide thrust for high-speed flight. The pusher propeller 22 may be mounted within an aerodynamic cowling 24 mounted to the rear of the airframe 8, though the cowling 24 is not necessarily required. While not required in all aspects, the main rotor drive system 20 can include two gas turbine engines as shown in FIG. 1B, but can be any other engine, including piston, jet, or other similar engines which produce torque.

Figure 2:
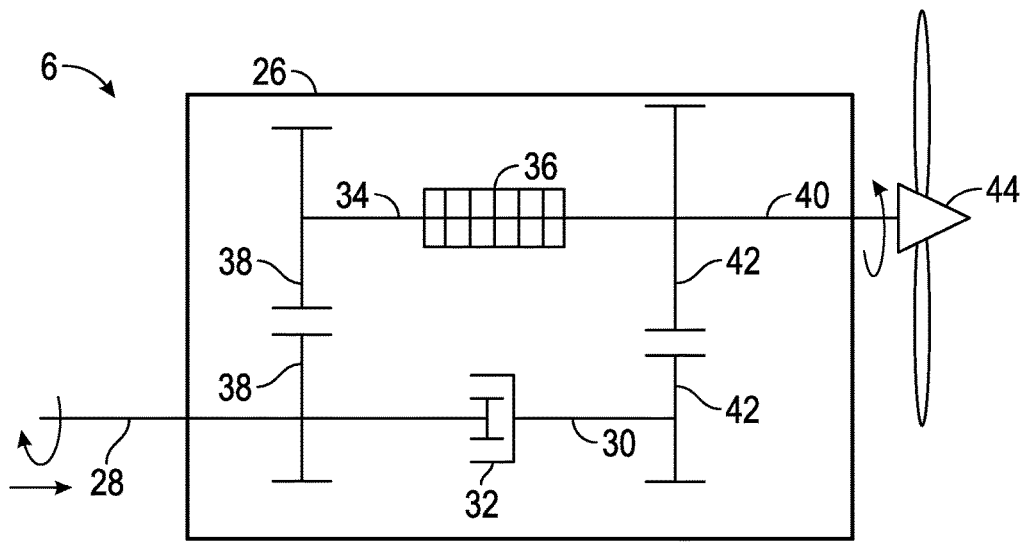
FIG. 2 is a schematic of a tail drive system according to one embodiment.

FIG. 2 shows one embodiment of a tail drive system 6 according to the present disclosure. A multi-speed gearbox 26 receives an input from the main rotor drive system 20, which rotates input shaft 28. In this example, the input shaft 28 enters the gearbox 26 and is operatively connected to a first free shaft 30 in a coaxial manner via a first transmissive device, which may be, for example, a freewheel unit 32. As used herein, the term "transmissive device" refers to any and all mechanical devices used to selectively transfer rotational energy from one device or shaft to another device or shaft in any incremental (including on/off) or continuously variable manner, including devices such as planetary gears, clutches, variable speed transmissions, and the like. The selective transfer of torque may occur by control, (i.e., where an input is received at the transmissive device or a controller for the transmissive device and the transmissive device is manipulated to alter the output torque in relation to the input torque), or by condition, (i.e., where the transfer of torque from the input to the output is dependent upon the state of other features in the system, e.g., a freewheel unit).

The input shaft 28 is also connected to a parallel shaft 34 by a first gear reduction 38. The parallel shaft, in turn, drives the input of a second transmissive device 36, such as a multiple plate clutch (as shown). The second transmissive device 36 selectively transfers torque to an output shaft 40, which is connected to the free shaft 30 by a second gear reduction 42. The output shaft 40 exits the gearbox 26 and is further connected to an output in the form of a secondary rotary device 44 outside of the gearbox 26. The secondary rotary device 44 may be a pusher propeller 22 or other rotary and/or propulsive device.

In this configuration, both the freewheel unit 32 and the second transmissive device 36 are operatively connected to and driven by the input shaft 28 and are operatively connected to and drive the output shaft 40. As used herein, the term "operatively connected" shall be used to refer to an engaging relationship between two or more features, where the connection may be direct or indirect, i.e., with one or more intervening features.

The shown tail drive system 6 allows the manipulation of the rotational speed and/or torque delivered to the secondary rotor device 44. For example, FIG. 2 shows the first transmissive device as a freewheel unit 32, which may be configured to allow the output of the freewheel unit 32, (connected to the free shaft 30), to rotate faster than the input to the first transmissive device. The second transmissive device 36 is a multiple plate clutch. Further, we note that the reduction ratio for the first gear reduction 38 is less than the reduction ratio for the second gear reduction 42. In this configuration, with the multiple plate clutch fully engaged, the difference between the first and second gear reductions 38, 42 would cause the free shaft 30 to exceed the rotational speed of the input shaft 28, which is enabled by the freewheel unit 32. With the multiple plate disengaged, the parallel shaft 34 would rotate independently of the output shaft 40, which then would be driven by the free shaft 30, which would be rotating at the same speed as the input shaft 28 by virtue of the freewheel unit. Thus, for a given rotational speed of the input shaft, the tail drive system 6 of the present disclosure provides at least two operational speeds as an option for the secondary rotary device 44. In the example illustrated in FIG. 2, both gear reductions 38, 42 serve to decrease the rotational speed going from the input shaft 28 to the output shaft 40, but by different amounts. Alternatively, the gear reductions 38, 42 may be configured to result in one operational speed being equal to or greater than the rotational speed of the input shaft. Other modifications are also possible, as will be apparent to those with skill in the art.

The input shaft 28 may be operatively connected to the main rotor drive system 20 so that the rotational energy is driven by the input to the main rotor system 4. In some examples, the input shaft 28 may be operatively connected to the main rotor drive system 20 at any other location, such as connecting the input shaft 28 for the tail drive system 6 at an input to the main rotor drive system 20.

As shown in FIG. 2, the output shaft 40 rotates in a direction opposite that of the input shaft 28, as a result of the reduction gears 38, 42. Other configurations are also possible wherein, for example, the output shaft 40 turns the same direction as the input shaft 28 by virtue of reduction gears 38, and 42 being configured with an extra gear.

Figure 3:
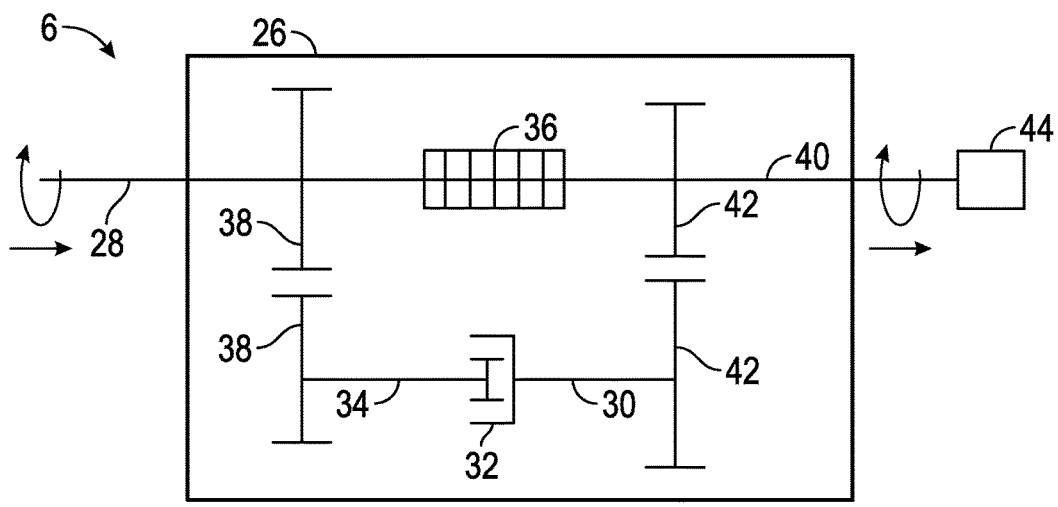
FIG. 3 is a schematic of a tail drive system according to another embodiment.

FIG. 3 illustrates another embodiment of the tail drive system 6, in which the input torque is coaxial with and rotates in the same direction as the output. In this example, the input shaft 28 enters the gearbox 26 and is connected to the parallel shaft 34 by the first gear reduction 38. The parallel shaft 34 terminates into the first transmissive device, such as a freewheel unit 32. The output of the freewheel unit 32 is connected to the free shaft 30. The input shaft 28 terminates into the second transmissive device 36, e.g., multiple plate clutch, which selectively transfers the input torque from the input shaft 28 to the output shaft 40. In this configuration, the reduction ratio of the first gear reduction is less than the reduction ratio of the second gear reduction.

In the embodiments of FIGS. 2 and 3, the second transmissive device operates by control (input) while the first transmissive device operates by condition, (i.e., the freewheel unit engages or disengages depending upon the state of the second transmissive device). Both of the embodiments discussed above, (FIGS. 2 and 3), provide at least two operational speeds of the secondary rotary device 44 for a given input speed. Depending on the reduction ratios of the gear reductions 38, 42, the different speeds may vary greatly. Additional speeds can be reached by using clutch control to manipulate the multiple plate clutch. Alternatively, the second transmissive device may be replaced with another gearbox or other transmissive device that allows additional levels of control.

The various gear ratios and controls associated with the present disclosure may be altered to achieve a desired range of operating speeds for the secondary rotary device without changing the operating speed of the primary rotary device. In one example, the tail drive system 6 may be configured to maintain a narrow RPM band in comparison with the rotor RPM of the main rotor system 4, with the second rotary device 44 operating at a first speed or at a second speed that is at or near 85% of the first speed. In this configuration, the secondary rotary device 44 can be operated to maximize efficiency. In another example, the tail drive system 44 may be configured to allow the secondary rotary device 44 to operate at a low speed, i.e., "whisper mode," where the noise signature of the secondary rotary device 44 is relatively low without changing the speed of the main rotor system 4. Other configurations may be devised to provide a high speed of a push propeller while the main rotors are at a low speed to provide efficient lateral movement of the aircraft.

As used herein, the boundaries and associated terms of and related to the gearbox are conceptual and may or may not refer to an actual physical housing. For, example, an embodiment in which the first and second gear reductions are arranged in separate housings would nevertheless reside within the "gearbox" as described above. Further, while not shown, it is understood that the main rotor drive system 20 could include a main gearbox and a variable speed gearbox in meshing engagement with the main rotor gearbox. The variable speed gearbox would permit at least two different RPMs for the main rotor system 4 without disengaging the engine(s) or changing engine RPMs, such as that shown in U.S. Pat. No. 7,296,767, the disclosure of which is incorporated by reference. In this manner, for a constant engine RPM, multiple rotor speeds would be available for both main and tail rotor systems.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

By way of example, aspects could be used in maritime engines, fixed wing aircraft, wind turbines, or other applications where efficiency is required for multiple rotors that can be operated at different speeds. Also, in the drawings and the description, there have been disclosed exemplary embodiments of the invention and, although specific terms may be employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A rotary wing aircraft, comprising:
   a main drive system having a main rotary system which is rotatable to produce main thrust;
   a main rotor drive system which drives the main drive system to rotate the main rotary system at a main rotational speed to produce the main thrust; and
   a tail drive system having a first shaft operatively connected to and driven by the main rotor drive system, the tail drive system further comprising a gearbox that receives the first shaft, the gearbox further containing:
   a first transmissive device, the first shaft operatively connected to an input of the first transmissive device;
   a second transmissive device, the second transmissive device arranged in parallel with the first transmissive device, the first shaft operatively connected to an input of the second transmissive device;
   a second shaft operatively connected to an output of the first transmissive device and to an output of the second transmissive device;
   a first gear reduction arranged in connection with the first shaft, the first gear reduction having a first reduction ratio; and
   a second gear reduction arranged in connection with the second shaft, the second gear reduction having a second reduction ratio; and
   a secondary rotary device operatively connected to the second shaft so as to be driven at a tail rotational speed to produce a tail thrust, the speed of the second shaft being variable according to a selective engagement of the first and second transmissive devices, wherein the speed of the second shaft is controlled by a first gear reduction in a first mode and controlled by the second gear reduction in a second mode.

2. The aircraft of claim 1, wherein the first transmissive device is a freewheel unit which transfers torque between the first and second shafts when the first and second shafts have the same speed, and does not transfer torque when the speed of the second shaft exceeds a speed of the first shaft.

3. The aircraft of claim 1, wherein the second transmissive device is a multiple plate clutch which transfers torque between the first and second shafts when the clutch is engaged, and does not transfer torque when the clutch is not engaged.

4. The aircraft of claim 1, wherein the secondary rotary device is a push propeller.

5. The aircraft of claim 1, wherein:
   the first transmissive device is a freewheel unit and a freewheel shaft connected to the second gear reduction and which transfers torque between the first and second shafts when the first and freewheel shafts have the same speed, and does not transfer torque when the speed of the freewheel shaft exceeds a speed of the first shaft, and the second transmissive device is a multiple plate clutch connected to the first shaft via the first gear reduction and which transfers torque between the first and second shafts when the clutch is engaged, and does not transfer torque when the clutch is not engaged.

6. The aircraft of claim 1, wherein the second reduction ratio is greater than the first reduction ratio.

7. The aircraft of claim 1, wherein the first shaft is directly connected to the input of the first transmissive device and wherein the first shaft is operatively connected to the input of the second transmissive device via the first gear reduction.

8. The aircraft of claim 1, wherein the second shaft is directly connected to the output of the second transmissive device and wherein the second shaft is operatively connected to the output of the first transmissive device via the second gear reduction.

9. The aircraft of claim 1, wherein the second shaft is directly connected to the output of the first transmissive device and wherein the second shaft is operatively connected to the output of the second transmissive device via the second gear reduction.

10. A method of operating a rotary aircraft having a multi-speed tail drive system, comprising:

generating input torque at a main rotor drive system to drive a main rotor system to produce main thrust;

transferring the input torque to a tail drive gearbox, the gearbox containing a freewheel unit and a transmissive device arranged in parallel to change a speed of a secondary rotary device; and manipulating the transmissive device to control the speed of the secondary rotary device to produce a secondary thrust, wherein manipulating the transmissive device allows the secondary rotary device to operate at two speeds relative to the input torque, a first speed being determined by a first gear reduction and a second speed being determined by a second gear reduction.

11. The method of claim 10, wherein manipulating the transmissive device targets an increase in engine efficiency.

* * * * *